Dec. 9, 1969 S. H. AULD 3,482,792

ENDLESS TAPE CARTRIDGE

Filed June 28, 1965 10 Sheets-Sheet 1

INVENTOR,
SAMUEL H. AULD

BY Richard A. Mansen

ATTORNEY

INVENTOR,
SAMUEL H. AULD
BY Richard A. Marsen
ATTORNEY

INVENTOR,
SAMUEL H. AULD
BY Richard A. Marsen
ATTORNEY

INVENTOR,
SAMUEL H. AULD

BY Richard A. Marsen
ATTORNEY

Dec. 9, 1969 S. H. AULD 3,482,792

ENDLESS TAPE CARTRIDGE

Filed June 28, 1965 10 Sheets-Sheet 5

INVENTOR,
SAMUEL H. AULD

BY Richard A. Mason

ATTORNEY

Dec. 9, 1969 S. H. AULD 3,482,792

ENDLESS TAPE CARTRIDGE

Filed June 28, 1965 10 Sheets-Sheet 6

INVENTOR,
SAMUEL H. AULD

BY Richard A. Marsen

ATTORNEY

Dec. 9, 1969 S. H. AULD 3,482,792

ENDLESS TAPE CARTRIDGE

Filed June 28, 1965 10 Sheets-Sheet 7

INVENTOR,
SAMUEL H. AULD

BY Richard A. Marsen

ATTORNEY

ENDLESS TAPE CARTRIDGE

Filed June 28, 1965

10 Sheets-Sheet 8

INVENTOR,
SAMUEL H. AULD

BY Richard A. Marsen

ATTORNEY

INVENTOR,
SAMUEL H. AULD
BY Richard A. Marsen
ATTORNEY.

ENDLESS TAPE CARTRIDGE

Filed June 28, 1965 10 Sheets-Sheet 10

INVENTOR,
SAMUEL H. AULD
BY Richard A. Marsen
ATTORNEY

United States Patent Office 3,482,792

Patented Dec. 9, 1969

3,482,792

ENDLESS TAPE CARTRIDGE

Samuel H. Auld, Wichita, Kans., assignor to Lear Jet Industries, Inc., Wichita, Kans., a corporation of Delaware Filed June 28, 1965, Ser. No. 467,599
Int. Cl. B65h *17/50;* G11b *25/06*
U.S. Cl. 242—55.19 19 Claims

ABSTRACT OF THE DISCLOSURE

An endless tape cartridge has a base and detachable cover each provided with suitable projections arranged when assembled to define: (1) a chamber in which a spool and tape coil thereon are rotatably supported and confined; (2) a series of guides arranged to direct the tape along a normal path from the inner convolution of the coil, forward and along the front of the cartridge for coaction with conventional transducers and drive means; then directly rearwardly back to the outer convolution of the coil, and (3) a temporary tape storage region between the cartridge front and spool chamber designed to temporarily store slack tape which may inadvertently occur around the coil or tape path. When the cartridge is used, any slack tape is first directed into the temporary storage region where it forms serpentine loops which are subsequently taken up on the outer convolution of the tape coil during normal operation.

This invention relates generally to magnetic tape cartridges containing the tape in endless array and basically in reel form, and more particularly to such cartridges with novel means for avoiding tape foul-up.

An endless tape cartridge is very convenient and practical to use. The advent of commercial eight-track recording on one-quarter inch wide magnetic tape affords stereophonic reproduction for eighty minutes with 400 feet of the tape. Wide-spread acceptance of such pre-recorded cartridges and associated players, for automobile and home entertainment, is contemplated. Thus, the cartridges are best made foolproof and foul-up proof, as well as simple and inexpensive in design and construction. This, with mass-production at relatively low cost, would accelerate their acceptance and popularity.

The reel of tape on the rotatable spool in the cartridge tion is directed is typified by that shown and described in the copending U.S. patent application of William P. Lear for "Magnetic Tape Cartridge System," now Patent No. 3,403,868. A player for such cartridge is illustrated in the copending case of William P. Lear and Samuel H. Auld for "Multi-Track Tape Cartridge Player," now Patent No. 3,437,762. Both said copending cases are assigned to the same assignee as the present application. The present invention embodies a number of significant novel features and improvements that particularly render such cartridges more stable and rugged in the rough and tumble of handling or shipping, during mobile operation on irregular terrain, and in the extremes of environmental conditions.

The reel of tape on the rotatable spool in the cartridge is not wound up tightly, but has some relative freedom between adjacent tape convolutions for its endless operation. The tape is pre-recorded, for entertainment usage. However, unrecorded tape may be incorporated for recording usage subsequent to assembly in cartridge 20. Such tape may be of any suitable and commercially available type, as a thin "Mylar" tape with a uniform magnetic iron oxide coating on one side, and a lubricant coating on the other as of "silicone" or of deposited graphite. When the cartridge is shaken up manually or in shipment, a surplus or slack tape portion often extends or is otherwise expelled from the reel into open spaces within the cartridge. Should one try to play the cartridge with its tape fouled-up in this fashion, the inevitable result is damage to the tape and inoperativeness of the cartridge.

Some prior art attempts to solve this important problem involved latching the spool during non-play. However, as the tape reel can readily slip on the smooth spool platform, no practical solution resulted thereby. Another approach uses a brake applied directly to the tape reel. However such braking means not only adds significantly to the cartridge cost, but in time weakens and frays the tape edges, and also is subject to breakage.

An important object of the present invention is to provide novel and effective means to "take-up" any surplus tape portion and thereupon return it to the reel in proper form. Rectification of surplus tape is accomplished automatically and directly upon the start of the playback operation. Such means comprises a take-up chamber in the forward region of the cartridge, generally between the locations of the pinch roller and the tape spool. Rotation of the pinch roller by the capstan drives the surplus tape portion into the take-up chamber in the initial phase. Suitable members are arranged to direct the tape into the chamber, preferably in serpentine array, as set forth in detail hereinafter. As soon as all of the surplus tape portion is thereby presented into and contained in the chamber, the reel and spool thereupon start to rotate. Their rotation causes the contained tape portion to become wound upon the tape reel as successive outer convolutions until it is all taken-up, whereupon normal cartridge operation resumes.

The rectification hereof of a surplus tape portion that may accumulate when a cartridge is mishandled is simple, effective, direct and automatic. It is accomplished with negligible cost for parts, material, assembly or test. All that is required is the molding in of the unique guiding means and chamber in the cartridge housing, in proper operative relation with the pinch roller, tape and spool. This can be effected directly through the construction of the molds for the base and cover of the cartridge, and is compatible with mass production techniques therefor. The space normally present between the spool and front edge of a cartridge has been found to be ample to store substantially more than the maximum length of tape that the reel may expel in its mishandling.

There is no creasing or wrinkling of the tape, nor exertion of any unusual pressures thereon in the invention cartridge. Neither is there weakening or fraying of the tape, since it is not held braked at any time. There are no displaceable or moving parts to get out of order. The height of the take-up chamber is preferably limited to avoid possible overlapping and tangling of the tape when in serpentine array therein. The invention tape take-up or rectification means requires no attention nor initiation to operate. When no surplus tape is present, the cartridge operates in the normal manner, just as though the take-up chamber and associated means were not present. However, the presence of any surplus tape, as aforesaid, directly results in its take-up and wind-out onto the reel.

The invention operation has been found to be foolproof and readily operative for even three times the average slack or surplus length. Also, it is so effective as to accomplish its function at even several times the speed of the normal tape play. Further, the invention principles and features are equally applicable to the cartridges, whether with full capacity reels, or with small tape loading.

An annular region or chamber is provided concentrically above the tape reel to suitably contain the surplus tape portion that is expelled in the said mishandling. The surplus tape is generally expelled from the reel through its inner convolution then in being. This action generally is generated with the cartridge off the player, so that no driving force is present to move the forward tape portion. As it is expelled, the tape is found to pile up in the annular surplus storage chamber above the tape reel. The appearance and tape length of such pile up is rather random, being dependent upon the nature, duration, force and type of mishandling of the cartridge. The expelled tape generally assumes a number of closely spaced gentle fold-overs without creasing, as is described and illustrated hereinafter. The folded, flat-laying surplus tape section partially rings about the annular storage chamber, in a rather stable array. Insertion of the cartridge in the player quickly causes the take-up and rectification of the thus stored surplus tape portion through the take up chamber and means referred to hereinabove. A surplus tape section about 12 inches in length is generally rectified and the cartridge restored to normal play within a few seconds, in a 3¾ inches per second tape speed system.

The above and other features, advantages and objects of the present invention will become more apparent in the following description of an exemplary embodiment thereof illustrated in the accompanying drawings, in which.

Figure 1:
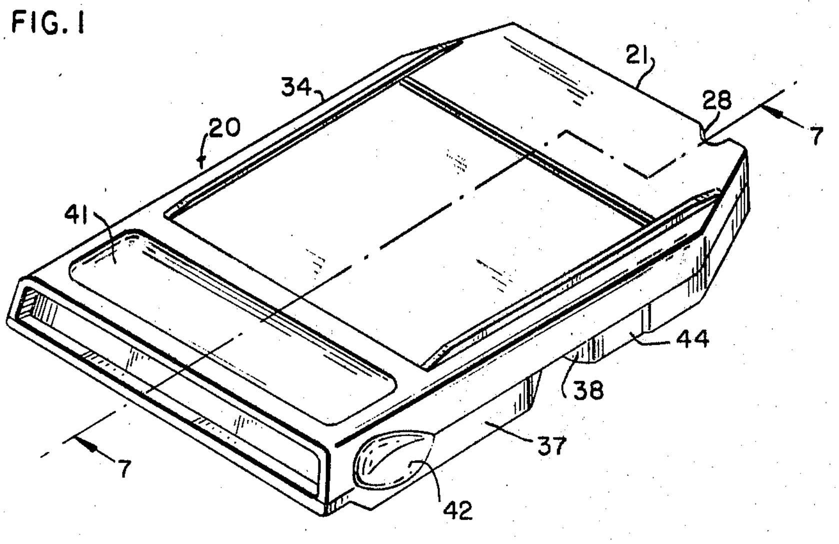
FIG. 1 is an exterior showing the exemplary cartridge, in perspective view.

The endless tape cartridge 20 is constructed of tough molded plastic components in rugged assembly, and relatively inexpensive for mass production and mass marketing. Cartridge 20 is an essentially self-contained unit, with a reel of tape in endless array therein. The external appearance and form of cartridge 20, and its basic internal components, arrangement and operation, are similar to that shown and described in the patent referred to hereinabove. In use, the cartridge is manually inserted in the player to effect direct play of the contained endless magnetic tape without auxiliary manipulation. Such direct operation is contemplated and made practical herein, whether or not a surplus tape portion has been unwound therein from the main reel.

A suitable player for the cartridge is shown and described in the aforementioned patent application Ser. No. 392,213. The forward end 21 of cartridge 20 is inserted into the player through a corresponding slotted opening. A pinch roller 22 is rotatably mounted on a fixed post 23. When cartridge 20 is fully and operatively inserted pinch roller 22 is engaged with drive capstan 24, with the adjacent magnetic tape 25 pressed therebetween. The forward end 21 may abut a safety stop for the cartridge. The tape 25 is held pressed against the face of magnetic pick-up head 27. Steady rotation of capstan 24 in the direction indicated by arrow *a* causes the traverse or movement of tape 25 at a uniform velocity across head 27 for reproduction of the recordings on the magnetic tracks on the tape. A semi-circular forward cut-out 28 permits capstan 24 to somewhat enter the cartridge end 21 and coact with the contained roller 22 and tape 25. A spring-pressed pad 29 stably holds the tape against head 27.

The region within the player for containing the cartridge has two parallel side wall guides 30, 31 indicated by dashed lines. Two spaced rollers are rotatably supported in side 30, and have their operative surfaces project to coact with the adjacent side 34 of the cartridge. A retention roller 35 is rotatably mounted on a leaf spring 36 and is biased beyond the side wall 31 towards the side 37 of the cartridge. Rollers 32, 33, 35 are all rotatable on a vertical axis so as to roll against the respective sides of the cartridge. The retention roller 35 creates a force component on the cartridge against the rollers 32, 33. Rollers 32, 33 minimize friction along cartridge side 34 as it is inserted in or removed from the player. Roller 35 when engaged with notch 38 in side 37 provides a further force component pressing the forward end 21 of the cartridge the contained pinch roller 22 and tape 25 against capstan 24. The rollers 32, 33, 35 are preferably made of a moldable material that is mechanically tough and self-lubricating, such as "nylon," "delrin," "teflon." The resultant arrangement affords an effective "floating" support for the cartridge with a predetermined operating force established for the pinch roller against the capstan with the tape 25 therebetween.

Forward cartridge end 21 has an inclined ramp 40 at its notched side 37. As the cartridge is inserted into the player, ramp 40 initially engages retention roller 35 as indicated schematically at 35'. Roller 35 thereupon rolls over the inclined surface of ramp 40 and is smoothly displaced to the cartridge side 37. Full cartridge insertion results in its engagement with capstan 24 as aforesaid, and the latching of roller 35 into notch 38 at the predetermined position to effect the play mode. Ramp 40 facilitates the cartridge insertion hereof overcoming the initial presence of the projecting roller 35. Spring 36 exerts sufficient force so that the retention roller 35 stably maintains the cartridge firmly forward in play position, even over irregular road conditions when in mobile use.

A top finger grip area 41 extends laterally across the upper region of the cartridge rear. Adjacent finger cavities 42, 43 are in sides 37 and 34 respectively. One thus may readily maneuver the cartridge into its respective removal, play or hold modes, and in proper orientation. Shallow notch 44 ahead of an dadjacent to notch 38 is used for holding the cartridge in the player, through roller 35, for either radio-play or no-play, as set forth in the aforesaid patent applications.

Figure 2:
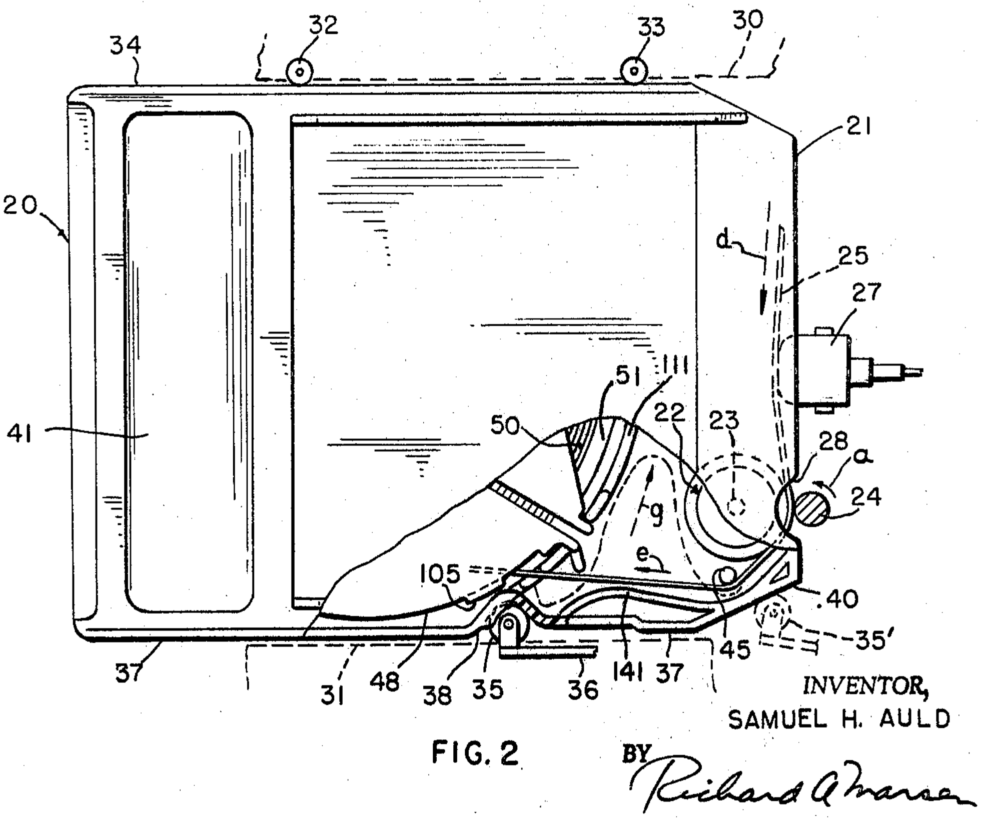
FIG. 2 is a plan view of the cartridge in play position, with its cover partially broken away.
Figure 4:
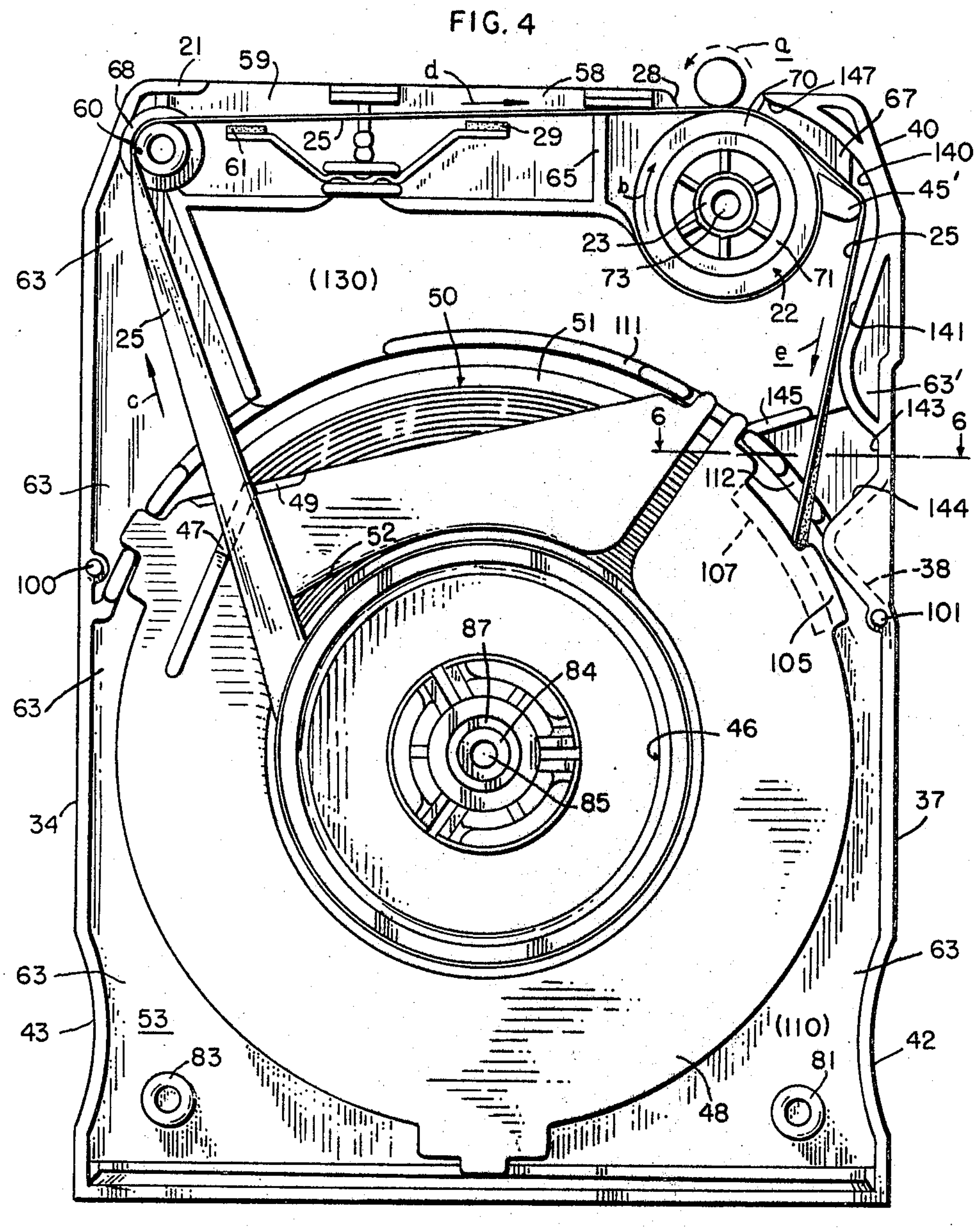
FIG. 4 is an enlarged plan view of the cartridge hereof, with the cover removed, in its normal play array.

The magnetic tape 25 is trained over a fixed guide post 45 and is drawn directly onto the tape reel 50 to become the outer convolutions thereon, as shown in FIGS. 2 and 4. Rotation of capstan 24 in the counterclockwise direction, arrow *a*, operates pinch roller 22 clockwise per arrow *b*, and the exposed loop of tape 25 in the directions indicated by arrows *c, d, e*. The tape 25 is payed-out at the inner convolution about central hub 46, in the direction of arrow *c* across adjacent inclined ramp 47 on over-reel wafer 48, and then around fixed guide post 60. The capstan and pinch roller draw the tape 25 in a vertical plane across the forward region near the end 21 of the cartridge, in the direction of arrow *d*. The tape reel 50 is supported on rotatable spool platform 51, and they are rotated together as tape is withdrawn in this manner during the play mode. This action causes the larger diameter outer convolutions to pull-in the tape 25 portion from the capstan-roller drive, in the direction of arrow *e*, around the fixed guide post 45 adjacent roller 22. Post 45 may be cylindrical as shown in FIG. 2, or of arcuate cross-section as shown in FIG. 4.

Figure 7:
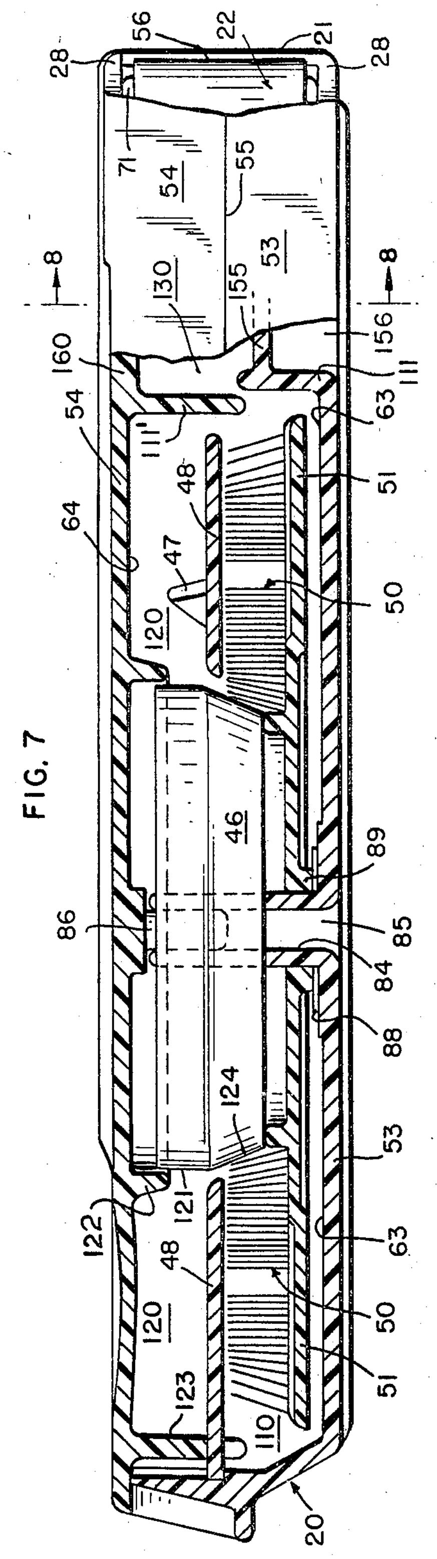
FIG. 7 is an enlarged transverse cross-sectional view through the cartridge, taken along the line 7—7 of FIG. 1.

The wafer 48 is a thin hard compositon member with smooth surfaces removably mounted onto the cartridge base 53 just above the tape reel 50, see FIG. 7. Wafer 48 is concentric about the central hub, and contains a shaped cut-out 52 at its interior rim adjacent the tape pay-out region at the inner convolution of reel 50. The configuration of cut-out 52 effects smooth unruffled tape pay-out thereat. The edge of water 48 just beneath the tape portion that leaves ramp 47 is rounded out and made smooth at region 49.

Figure 3:
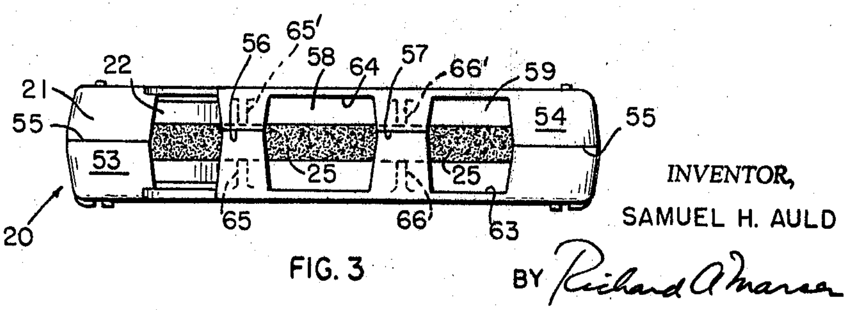
FIG. 3 is a front view of the cartridge of FIG. 1.

As seen in the front view, FIG. 3, the base 53 and cover 54 mate as a unitary cartridge assembly, generally along a central plane at edges 55. The tape section 25 is moved across the frontal openings: 28 at the pinch roller 22; 58 for entry of the pick-up head 27; and 59 for entry of "end-of-track" sensor (not shown). Spring-pressed felt pad 29 presses the tape against head 27 when inserted; pad 61, against the sensor. Two spaced central uprights define the extent of the three frontal openings, and latch over edge-to-edge along joints 56, 57 respectively. The tape 25 is supported and guided horizontally, centrally along the frontal openings 28, 58, 59, by a series of internal guides along the frontal region of the cartridge. This is necessary for the endless tape operation as the vertical distnace between the interior bottom and top surfaces 63, 64 respectively of base and cover 53, 54 are spaced apart much more than the tape width. In the exemplary cartridge such spacing is about ¾", almost three times that of the contained ¼" tape.

The frontal internal tape guides may be pairs of transverse ribs molded into both the base 53 and companion cover 54. Two such pairs are indicated by dashed lines centrally in FIG. 3 at 65, 65′ and 66, 66′, and appear in FIGS. 4 and 5 respectively. These rib sets lie perpendicular to the front end 21, and extend vertically in the cartridge as illustrated. Their opposing ends are spaced just a bit more than the tape width to permit free transport thereof. The tape may touch the lower ribs 66 and 65′, but is generally constrained to the predetermined central level set by the rib pairs 65, 65′ and 66, 66′. There are two other frontal internal guide pairs for the tape in cartridge 20, one at each front corner adjacent the fixed guide posts thereat. As shown in FIG. 4 a transverse rib 67 extends from post 45′, with the tape 25 resting thereon. The companion rib 67′ (FIG. 5) is arranged to overlie rib 67 when the cartridge is assembled, spaced apart vertically as are ribs 65, 65′. Similarly, an annular rib 68 surrounds guide post 60 and extends vertically from inner base surface 63 to the bottom edge of the guided tape 25. The companion ring 68′ in cover 54 overlies ring 68 with the proper spacing, and its cavity 69 engages post 60 as one of the grips for the cartridge assembly, to be described.

The exposed tape loop 25 during normal play is thus closely guided, in the invention cartridge, from its initial payout at hub 46, across the curved cut-out 52, onto inclined ramp 47, around fixed guide post 60 and vertically between its spaced rings 68, 68′, vertically between internal guide rib pairs 66, 66′ and 65, 65′, about the surface of resilient guide roller 22, between guide rib pair 67, 67′, around adjacent fixed guide post 45′ and on to its return to the reel to form the outer convolutions thereof. The metal capstan surface presses against the tape and the deformable surface of pinch roller 22. The vertical height of the exemplary roller 22 and capstan thereat is more than twice the tape height. The internal guides herein set forth maintain the tape level across the pinch roller 22 for smooth wowless operation, stability of the continuous tape traverse, and its proper functioning in the cartridge.

The exemplary pinch roller 22 comprises a resilient rubber-like tire 70 of uniform thickness mounted about a central hub 71. Hub 71 is sizable and strong, yet made light in weight and minimum of material. A central sleeve 72 has a number of thin radial ribs or fins that support the outer shell about which tire 70 is firmly supported. The sleeve 72 rotatably fits over post 23 that is integrally molded with base 53. Post 23 has a central opening or hole 73 through it to coact with a pin 74 extending opposite it from cover 54, see FIGS. 4 and 5. The post and pin 23, 74 establishes one of the close-fit gripping pairs for the two cartridge halves 53, 54.

The cartridge hereof incorporates novel and advantageous cover-base interlocking and closure means that is very practical to withstand severe and rugged handling. Towards this end a plurality of pins or posts are molded integrally in one cartridge section, in the cover 54 herein, and a corresponding set of mating sockets or hollow posts are molded integrally in the other section, in the base 53 herein. These post-socket pairs are located in a spaced balanced array in the cartridge, merged with other functions or elements, or independent in clear regions. The post-sockets are constructed to mate firmly by simple pressing together, and thereby close and secure the two cartridge halves as a single integrated assembly that is difficult to part in even rough usage.

The herein cartridge assembly closure securement arrangement, further, lends itself to mass production techniques, and avoids the problem and cost of using screws and threading as heretofore. In essence, posts and sockets sets are molded to fit together by friction, each over a substantial area. This is effected, in the exemplary unit, by posts depending from the cover 54 that are the order of ¼" long and ⅛" in diameter. The hollow mating members or sockets extend up from the base 53 into the cover region to closely engage with their respective posts thereat. The pins are slightly tapered and the forward end of each socket is rounded off, for ready assembly. By using tough but yieldable material for the cartridge base and cover and the sockets and posts molded integrally therewith, tight frictional engagement is effected across each post and socket pair. The medium impact composition hereof avoids stess crazing and results in very long use without damage. A material found to be effective and practical for this purpose is "Styron" No. 363 of Dow Chemical Company. It is in the polystyrene family, with added latex.

Figure 8:
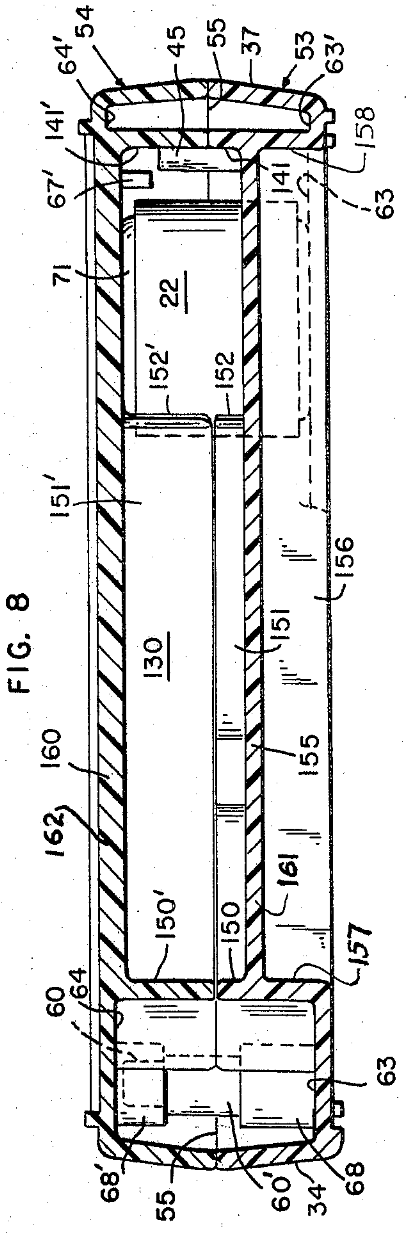
FIG. 8 is a vertical cross-sectional view of the cartridge, across its take-up chamber, taken along the line 8—8 of FIG. 7.

The post-socket grip pairs are preferably affixed with one near each cartridge corner and one centrally, for stable securement. The two described grip pairs 23, 74 which serves also as the pinch roller bearing post; and 60, 69 which is also a fixed tape guide, are in respective corner regions of the forward section. The 60, 69 pair is larger in diameter in view of its dual function. Post 60 contains an aperture on through the base floor 53, for practical molding purposes. There are two rear corner pairs comprising posts 80, 82 extending from the cover 54, and companion sockets 81, 83 from the base 53. A further grip pair is used as bearing support for the spool-reel at center of hub 46; namely central upstanding bearing member 84 with through-aperture 85 integrally molded with base floor 53, and companion post 86 with cover 54, see FIGS. 4 and 7. The inner sleeve 87 is of self-lubricating composition material and is freely rotatable on base post 84. A washer 88, as of "Teflon" underlies a flange 89 of the spool base 51 to facilitate its easy turning. Also, a thin Teflon sleeve 60′ is preferably slipped over guide post 60, as seen in FIG. 8, to better maintain a lubricated traverse of the tape thereat.

Figure 5:
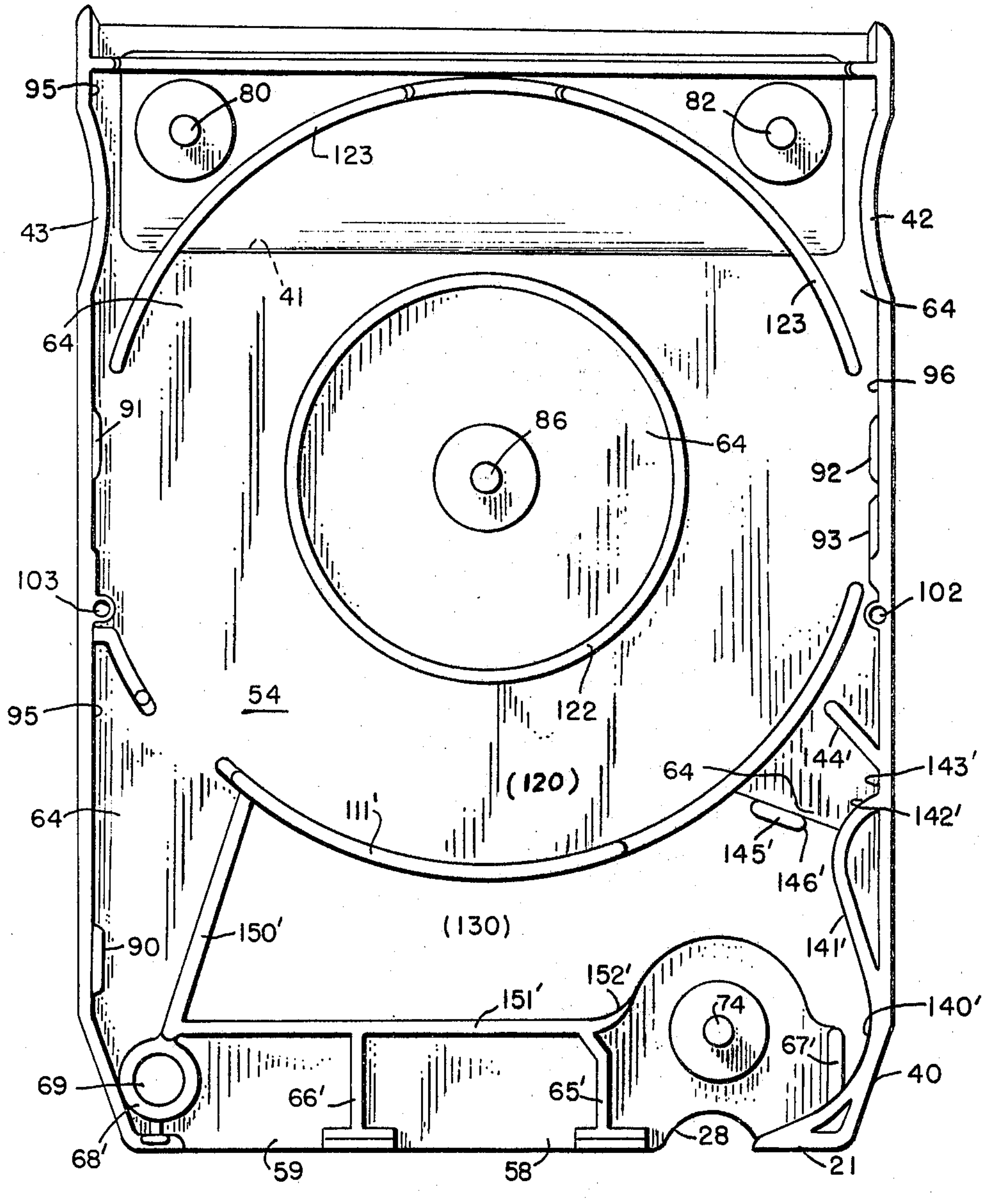
FIG. 5 is a plan view of the cartridge cover showing its interior.

To emphasize the ruggedness and sturdiness of the assembled cartridge housing, and insure against its cover-base seam 55 parting in use due to impacts, warpage, etc. a number of lips are formed on the sides of cover 54. Such lips project up from the cover sides and are indicated in FIG. 5 at 90, 91, 92, 93. They are molded contiguous with the side wall interiors 95, 96 so as to protrude into the base region and be flush with the corresponding interior side walls 97, 98 of base 53. A further feature hereof is the provision of a pin 100 and 101 projecting up from each side of the base 53 for snug engagement with corresponding apertures 102, 103 in the side walls of the cover 54. These pin-apertures are arranged to resist lateral displacement of the cover and base members of the cartridge housing, as might occur when dropped on a hard surface.

Figure 6:
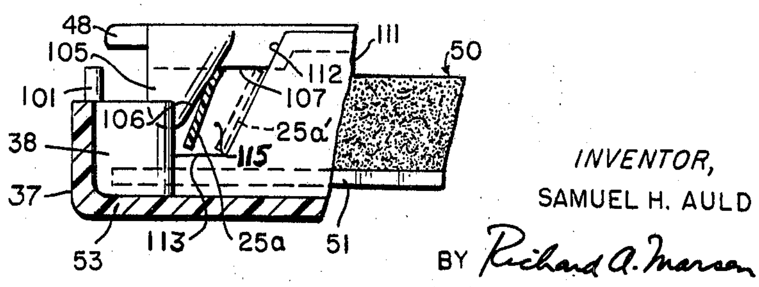
FIG. 6 depicts the tape entry section of the reel-spool chamber, as viewed from the line 6—6 of FIG. 4 in the direction of the arrows.

As shown in FIG. 6, the wafer 48 incorporates a depending tooth member 105. Tooth 105 is mounted adjacent to the entry location **25*a* of the tape loop 25 back into the tape reel (50) chamber 110, (see FIGS. 4 and 7). The side 106 of tooth 105 that faces the tape 25 at its entry is inclined in the manner illustrated. Inclined edge 106 is arranged to tilt the tape 25 from its substantially vertical orientation that it has when it leaves guide post 45′, for foul-proof winding onto the tape reel 50 as outer convolutions. The exemplary inclination for edge 106 is about 35° from vertical. Without the use of a tooth as 105, the tape tends to "climb-up" on the reel as it is wound on, in a helical manner, thickening the reel thereat until it contacts the superimposed wafer 48** which in turn causes frictional drag and end up as a fouled cartridge.

The inclined tooth 105 causes the tape 25 to lay onto the then outer convolutions in an angular condition leaning onto to reel 50, see FIG. 7. The result is no foul-up, no reel thickening, and excellent spiral reeling-up of the tape onto the spool 51 in its operation. Additionally the underside 107 of the wafer 48 is thickened in the vicinity of and adjacent tooth 105, and below the basic wafer plane as shown in FIG. 6. The level of surface 107 insures that the vertical extent of entering tape **25*a* is substantially that of the reel 50 itself. This feature complements the action of the inclined tooth 105 for the stated purposes. Further, the annular surround rib 111 adjacent the said tape entry location is also formed with an inclined edge 112 substantially parallel to tooth edge 106. A bottom ridge 113 is formed in surround 111 below surface 107** and spaced therefrom only somewhat more than the tape width.

Figure 9:
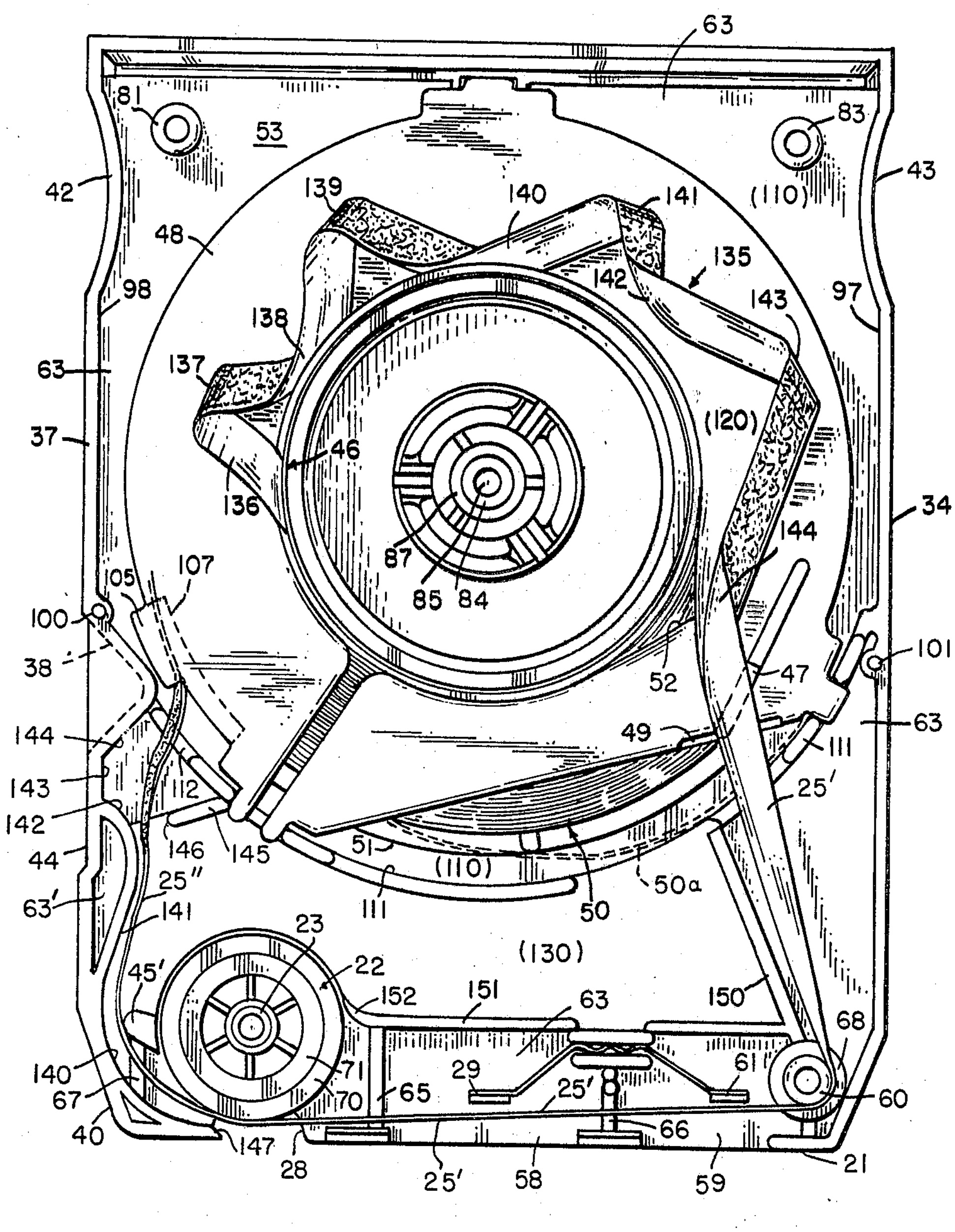
FIG. 9 is a plan view of the cartridge (corresponding to FIG. 4), illustrating a stored surplus tape array.

The surfaces 106, 107, 112, 113 form a relatively narrowed opening 115 for the tape at **25*a* to enter the reel chamber 110. Its shape is as a parallelogram dimensioned to provide ample clearance and direction to the tape as it normally enters onto the tape reel 50. As seen in FIGS. 2, 4 and 9 the inclined tooth 105 meets the tape 25 well beyond the inclined surround surface 112 which meets it first. Nevertheless, these surfaces coact to form the definitive opening 115 for tape entry to reel chamber 110, wherein no interference to the tape progress therein occurs during normal operation of the cartridge. However, if due to mishandling a surplus of tape is expelled from the reel 50, the opening 115 prevents excess tape from entering chamber 110** and folding-back on itself therein fouling-up its array, as will be described in more detail hereinafter.

The reel chamber 110 comprises the region within which the reel 50 of tape is contained in its normal storage or reeling mode. Chamber 110 is generally defined as below the wafer 48 wherein the spool 51 and reel are rotatably supported. An arcuate rib wall 111, 111′ encloses chamber 110 between the spool-reel 50–51 and the forward end of the cartridge. The lower surround wall 111 is formed in base 53; the upper one 111′, in cover 54, extends down to lower one 111, as shown in FIGS. 4, 5 and 7. Surrounds 111 and 111′ are generally coextensive, and shield the reel and tape from entering the forward area of the cartridge from within chamber 110 therethrough. Arcuate surrounds 111, 111′ extend across the cartridge from side to side. The upper portion of surround 111′ is above the level of reel chamber 110 and serves as the forward barrier or wall for the upper chamber 120, namely above wafer 48, to be described. The remainder of reel chamber 110 extends to the rear section of the cartridge which mainly includes to adjacent open corner zones containing posts 81, 83.

Upper chamber 120 is of torroidal configuration formed above wafer 48: confined generally between the cylindrical hub extension 121 and annular ring or flange 122 overlapping cylinder 121 at the interior; the cover ceiling 64 and top surface of the wafer; and the outer arcuate surrounds 111′ and 123; see FIGS. 5 and 7. The vertical extent of upper chamber 120 is preferably, but not necessarily, the order of the tape width. Thus ample store for surplusage tape and its fold-overs is provided. This torroidal upper chamber 120 is concentric with the hub 46, spool 51, and tape reel 50. As described hereinabove, the magnetic tape is payed-out from the inner convolution of reel 50 as it becomes tangent to the inclined hub 124. The payed-out tape section 25 enters into upper chamber 120, normally passes over ramp 47 therein, and then out to guide post 60, 60′ at the front end, not shown in FIG. 7 for the purpose of drawing clarity. There is a significant and important third chamber in the invention cartridge hereof, namely the tape take-up chamber 130. Take-up chamber 130 extends forwardly of both chambers 110 and 120, from frontal surrounds 111, 111′ and towards the front of the cartridge. Also, the level of chamber 130 is preferably, though not necessarily, intermediate between chambers 110 and 120.

Take-up chamber 130 is not brought into use during the normal tape play mode such as depicted in FIGS. 2 and 4. When there is no surplus or slack tape expelled from reel 50, the exposed loop 25 extends from ramp 47 to guide post 60, on across the front of the cartridge on the internal guides, around pinch roller 22 and guide post 45 or 45′, and back to the reel in chamber 110 in a linear path through the four sided opening 115 at its entrance. When a cartridge is shaken-up vigorously or otherwise mishandled an excess of tape 135 is caused to leave reel 50, i.e. when not in play mode but caused by handling, in shipping, etc. As explained in the introduction above, this becomes possible when no brake is used on the reel, as in the invention cartridge. Take-up chamber 130 in conjunction with other means, soon to be described, automatically come into operation when such cartridge is engaged in the play mode, to directly rectify the tape surplusage.

FIG. 9 illustrates in plan view one form of appearance of a tape surplus section 135 that may be formed. Its actual overall length, positions and types of fold-overs, and general array depend upon the actual progress of its shake-out, its duration and other factors of no direct concern here. The present invention has been found to rectify the tape surplusage however formed, of any length possible therein, and of any array that may be developed. The tape array 135 shown in FIG. 9 is just as was developed in the invention cartridge 20 during a typical shakeup, and is drawn from a photograph thereof. Its form is to be considered only as indicative for purposes of exposition and better understanding of the processes involved. The initial tape exit portion 136 herein occurred about 180° away from ramp 47 and wafer cut-out 52. Eight soft loopovers took place, namely at 137″ through 144″, spread loosely and in a random manner all within upper chamber 120, and lying on the surface of wafer 48.

The magnetic tape used as any suitable commercially available type. Only the magnetic oxide coated side, shown stippled in the drawing, is pressed against the pick-up head 27 in playback. This is the tape side that faces to the front 21 as viewed in FIG. 3. The reverse or "interior" tape side is drawn clear (unstippled) for better interpretation of the surplus tape loops in FIG. 9. The interior or non-magnetic side of the plastic-base tape is coated with a suitable lubricant, as colloidal graphite or "silicone," in a well known manner. Incidentally, the front loop 25′ is herein generally loose in place, and its portion shown over ramp 47 may be differently located in other surplage arrangements. Also, the returning tape leg 25″ is generally not linear, and the outer convolution at least is often loosened away from the reel 50 proper. Such outer turn displacement is indicated at 50*a*, in dashed lines, extending to surround 111. The surplus 135 that is generally possible to "extract" from a reel 50 of tape 400′ long is about 12 to 15 inches long. A 400′ reel length affords 80 minutes of double -track stereo recordings using eight tracks, and when player at 3¾″ per second. The exemplary cartridge 20 handily accommodates such 400 foot reel, in endless array, with dimensions: 4″ x 5½″ x ⅞″. Smaller tape lengths, as 100 feet or less may also practicably be played therewith.

When cartridge 20 has a surplus tape portion as 135 shown in FIG. 9 and it is positioned in the player, the drive operation by capstan 24 against the front tape portion 25′ and pinch roller 22 starts the movement of the loosened tape in its rectification cycle, now to be described. The principles and significant features of this new and very important contribution are set forth in conjunction with representative showings of successive steps thereof, in FIGS. 10 through 19. The upper chamber 120 generally contains most of the surplusage 135, in randomly bent-over, folded or bunched array, as described hereinabove. This surplusage 135 is thereupon initially basically transferred into take-up chamber 120 by the operation of capstan 24 on pinch roller 22 with the tape therebetween. However, a small forward tape portion is first pushed into the reel chamber 110 in the process. Such forward portion may be from 2 to 4 inches in length. In less than one second, then, the serpentine take-up formation commences in take-up chamber 130. This proceeds until all of surplusage 135 has been removed from the upper chamber 120, and tape payout again takes place. The reel and spool 50, 51 thereupon start to rotate and the surplus tape that was temporarily stored in chamber 130 is drawn out onto the reel 50, returning the cartridge to normal array and play.

Before proceeding to the operational steps of the tape surplusage rectification further physical means and features of the cartridge hereof to effect such process are now described. Two successive guide surfaces 140, 141 are arranged in the vicinity of pinch roller 22 and guide post 45′ (or 45), as seen in FIGS. 4 and 9. Surfaces 140, 141 are formed as a continuous wall surface projecting perpendicularly to base 53, together with mating companion surfaces 140′, 141′ simialrly projecting from cover 54. They are also denoted as "curved guides," "curved walls or surfaces," or "tape directors" 140, 141 herein. Curved surfaces 140, 141 function as tape directors in thesurplus tape rectification as will be set forth. The degree of curvature of surfaces 140, 141, and of companion surfaces 140′, 141′ that are coextensive and in the same plane therewith, is important but not critical. It is important to shape these walls for foolproof and efficient tape direction in the manner to be described. The drawings hereof are all to scale and the curvatures of walls 140, 141, 142, as well as their relative location with respect to capstan 22, guide post 45′ and the entry region 112 to the reel chamber 110 are proportioned as in the exemplary cartridge.

The wall 141, 141′ curves back at its far section 142 to side wall 37 in the vicinity of secondary notch 44. The inner wall portion 144 behind the main external notch 38 is inclined towards the entry region 112 of reel chamber 110. The straight small section of inner side wall 143, together with the two diverging wall surfaces 142, 144 form a tape shaping zone adjacent the entry region 112. The corresponding mating wall surfaces of the cover are noted as 142′, 143′ and 144′. A further important member is projecting prong or wall 145 with a curved tip surface 146 in the vicinity of entry 112. The mating prong 145′ extends from cover 54 and abuts and overlies wall 145′ when assembled as a cartridge, with its rounded tip 146′ coacting with tip 146. Its function is to insure that the tape loops are properly formed and readily enter the take-up chamber 120, as will be described further on.

Further points of significance are the tips 147, 147′ at cut-out 28 at which curved surface 140, 140′ may be said to start, is positioned rather close to the surface of pinch roller 22, of the order of 0.100″. This is to prevent the formation of a loop of tape between the capstan and curved wall 140, 140′ as the tape is pushed along wall 140, 140′ during rectification. Also, the effective surface of guide post 45′ (or 45) is in proximity to the central region of curved wall 140, 140′, and is positioned to serve as a normal guide post. Thus guide post 45′ (or 45) maintains the portion of tape 25 between it and the pinch roller linear and away from walls 140, 141 in the normal mode; and also linear to entry 112 of reel chamber 110 and away from these walls, as seen in FIG. 4. It is thus evident that the presence of the wall members 140 through 146 in no way interfere with the normal play operation of the endless tape in cartridge 20, and do not contact the tape or add friction during the normal tape transport.

The take-up chamber 130 receives the surplus tape 135 in random scatter fashion when tape entry into reel chamber 110 backstops despite the roller-capstan 22, 24 feed, as aforesaid. The chamber 130 is an elongated substantially enclosed region between the reel and upper chambers 110 120 and the front end of the cartridge. The side of chamber 130 at the side of pinch roller 22 is formed by the upstanding curved walls 140, 140′ and 141, 141′, starting from internal guide 67, 67′ and on back to the position of prong wall 145, 145′. The rear wall of chamber 130 is formed by the vertical mating surround walls 111, 111′. The other side chamber wall is the transverse rib pair extending upwardly from the surrounds 111, 111′ to guide post 60. The forward wall of chamber 130 is composed of ribs 151, 151′ that mate together in the vertical plane when assembled, as seen in FIG. 8, and the rear of the pinch roller 22. The tips 152, 152′ of walls 151, 151′ that are adjacent to roller 22 are preferably shaped-out in tangential form close to the roller surface to prevent tape loops projecting therebetween from chamber 130. A clearance of the order of 0.010″ thereat is satisfactory.

The internal height of take-up chamber 130 may be that between the inner surfaces 63, 64 of the base-cover 53, 54 assembly. Such height is more than the width of the magnetic tape therein, and so the loop formation in chamber 130 occurs freely and smoothly, with the tape in vertical orientation, i.e. normal to surfaces 63, 64. It is preferable that the chamber 130 height be less than about twice the tape width to insure against overlapping of the loops one on top of another or possibly tangling thereof during rough mobile operating conditions. Very satisfactory tape surplus rectification in accordance with the principles of this invention occurs even when the chamber 130 height exceeds twice tape width. In the exemplary cartridge 20 the height of chamber 130 is reduced to below twice tape width even though the spacing between the interior cartridge walls 63–64 exceeds such height.

The incorporation of the desired floor and ceiling levels for chamber 130 is best provided with wall thicknesses of the order of those in the remainder of the cartridge, to conserve material and enhance mass-molding techniques. Towards this end the floor 155 of chamber 130 is formed as a shallow cavity 156 in the underside of base 53 as seen in FIGS. 7 and 8. The chamber floor 155 is thus raised as required, towards the ceiling 160. The thickness of the molded floor 155 is the same as that of the base 53, cover 54, and the adjacent vertical walls 157, 158. The ceiling thickness may be made somewhat thicker as indicated at 160 if desired, over the area of chamber 130.

The exemplary height of chamber 130, between floor surface 161 and inside ceiling surface 162 is desirably less than twice tape width. Thus for ¼″ magnetic tape, a height 161–162 of 0.400″ is very practical; but may be even a bit more, or may be as low as 0.275″. Further, it is desirable to make the level of floor surface 161 in chamber 130 slightly lower than the lower level of the internal tape guides as at rib 67 near guide post 45′ (see FIG. 9) in order to minimize frictional drag on the bottom edge of the tape when in the surplus rectification phase. Reference is made to U.S. Patent No. 2,679,394 issued May 25, 1954 to William P. Lear for "Magazine and Drive for Magnetic Reproducers." This patent illustrates an endless tape magazine with a capstan-pinch roller drive for the tape therein in a serpentine array. The tape is vertically oriented therein, and the cartridge is made relatively shallow for its random orientations along a common plane. Such tape action is the basic mode of its movement and transport for its play operation. The serpentine actions of the surplus tape, in the present invention, in take-up chamber 130, are however considerably different in arrangement, function and purpose as will now be described in conjunction with diagrammatic FIGS. 10 through 19. These figures demonstrate a typical full cycle for the rectification of a sizable surplus tape section, as about 12″ from a 400′ reel herein.

Figure 10:
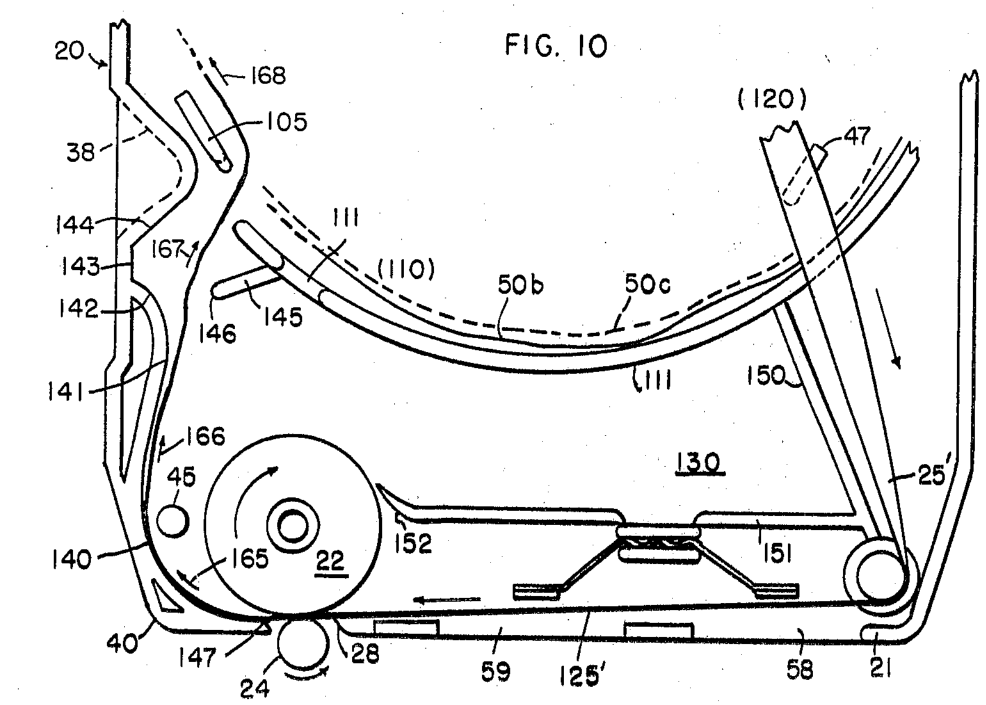
FIGS. 10 through 19 are diagrammatic illustrations of the action and operation of the exemplary cartridge used in the explanation of its taking-up and containing a surplus tape portion, and thereupon restoring it upon the reel.

When a cartridge hereof contains surplus tape 135 extended from the reel 50 in any manner or array as hereinabove explained, and as shown in one form in FIG. 9, the predominant surplusage portion becomes contained in the upper chamber 120. The tape section 25″ adjacent the entry region 115 of reel chamber 110 becomes limp, and an outer turn or two of the reel 50 is loosened as indicated at **50*a*. Outer turn 50*a* has portions that limply touch surrounds 111, 123 of chamber 110, and there results also the back-up and storage of the surplusage in the upper chamber 120, as there is no feed-through or drive of the tape when out of the player. Placement of the cartridge with such tape array against capstan 24 in the player, as shown in FIG. 10 generates a linear force or push on the tape past the roller-capstan 22, 24 in the direction of arrow 165 along director curves 140, 141 per arrow 166 and into chamber 110 at arrow 167. For a short period, the order of one second herein, the tape is pushed into chamber 110 at the outer convolutions, per arrow 168. The loosened outer turns of reel 50 become fuller, fill in against surrounds 111, 123 as indicated at 50*b* and 50*c*, until the longitudinal back-pressure along the tape results in slow down of its entry to the reel chamber 110. As stated, about 2 to 4 inches can be "absorbed" into chamber 110**, as loose outer turns.

Figure 11:
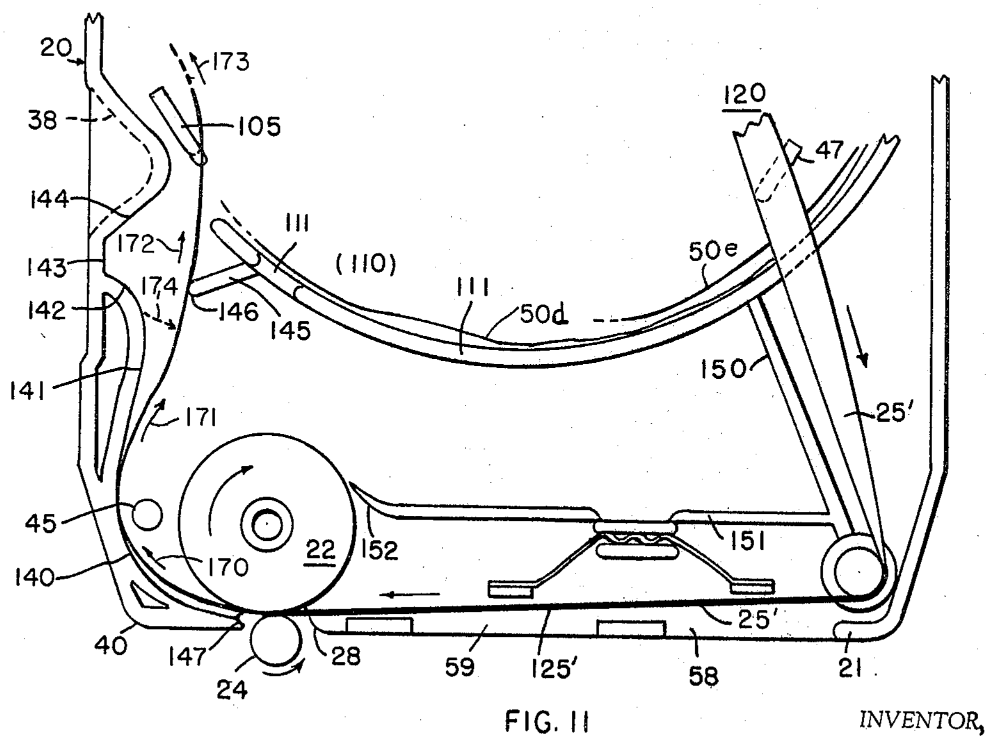

FIG. 11 illustrates what occurs directly upon such backing-up of the tape. It still is pressed against curved wall 140 (at 170), and commences to recede from the far portion of wall 141 (at 171). The tape portion near the entry (at 172) swings towards prong 145, against tip 146. Such support at the chamber entry results in completion, per arrow 173, of the outer turns and back-stopping, indicated at **50*d*, 50*e*. The longitudinal stiffness of the tape, though small is significant towards this end. Its resilience and flexibility further contribute to the rectification hereof in an efficient smooth manner. The swing over or deflection of the tape is indicated by arrow 174**.

Figure 12:
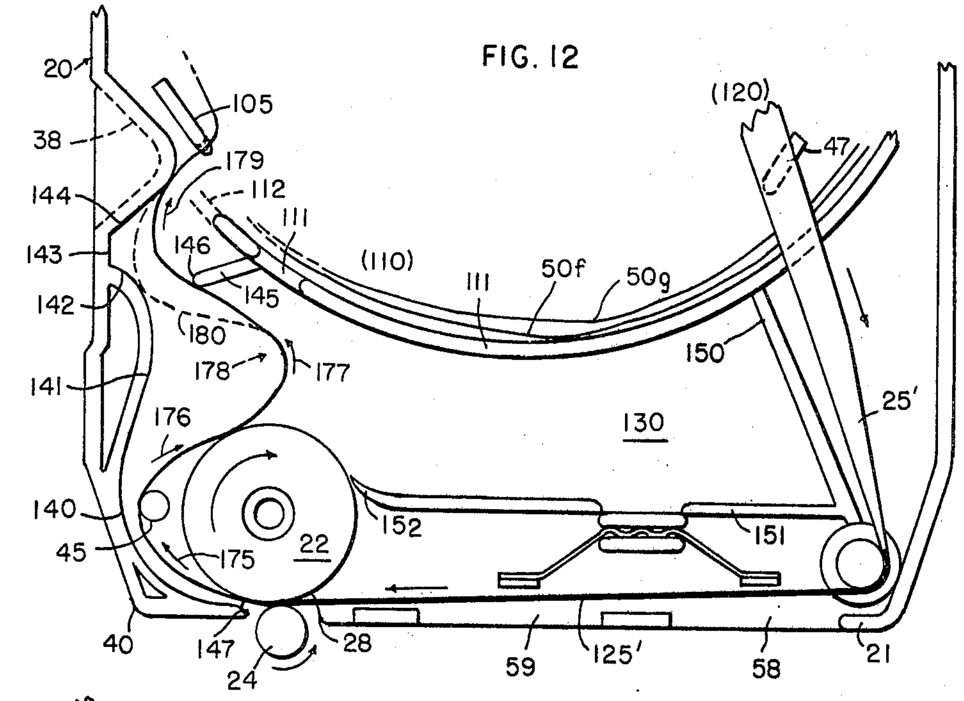

FIG. 12 illustrates the next step in the rectification process, close in time to the preceding. The short fill-up of chamber 110, stops further tape entry. This is insured by the construction hereof in the tape entry region to chamber 110 soon to be noted. The tape is initially curved by director wall 140 along arrow 175, and due to back-stoppage at chamber 110, basically swings or deflects in the direction of arrow 178. It is to be borne in mind that the roller 22 is being continuously rotated, and keeps pulling usrplus tape 135 out of its stored region 120 while pushing it against curved director surface 140 initially. Its swing 178 due to longitudinal "body" causes its tangency against guide pin 45, the pinch roller 22 (in 176 region), and projecting tip 146 due to bulge or loop forming forwardly at path 177. The tape in this phase may alternatively snap and extend back to curved wall 142, and form a back-loop with the air of inclined wall 144, indicated at 180. Inclined wall 144 in conjunction with entry 115 configuration (see FIG. 6), is important in insuring the prompt back-stoppage of the initially injected tape section to chamber 110.

Surface 144 inclines the tap, when in its outer turn fell-up (**50*f*, 50*g*) phase, radially to the coil 50, i.e. normal to its turns, as well as across the inclined narrow entry parallelo-piped 115. This action is very significant for when a reel length is a small percentage of capacity, e.g. 100′ on a 400′ size. By insuring early back-stoppage of the tape in this manner, being "locked" across the inclined surfaces 106, 112, and horizontal surfaces 107, 113. The inclined director surface 144 projects the tape across, almost parallel to the cartridge end 21, and causes the stoppage of tape into chamber 110 by its "locking" across the inclined entry 115 after only a very few inches of tape have been injected into the chamber 110. Such tape locking action occurs basically between wall surface 144 and the inclined surround at 112. This prevents further injection of the tape into chamber 110. The direction of incline of surround entry surface 112, and its relative position at entry 115, prevents the injection of tape into chamber 110 in the wrong direction, counter-clockwise herein, that would result in the tape binding up therein. When the tape is about to bind or fold back upon itself as it enters reel chamber 110, the tape will first try to assume a vertical orientation in the chamber 110 as it would begin to fold. Should this action start to occur, the tape is directly bound in the parallelogram 115 which prevents further entry of tape into chamber 110, as aforesaid. For fuller reel loads, such tape "locking" at entry 115 can occur even without the action of inclined surface 144. Thus in FIGS. 14–17 the back-stopped no-entry condition is involved, with the tape either back-pressured from the outer turns 50*f*, 50*g* and/or the inclined entry structure 115**.

The forward loop in FIG. 12 is urged in the direction of arrow 178 towards the take-up chamber 130. It is important to note that it from almost its inception comes in contact with the back surface of the pinch roller 22. The normal direction of its rotation, clockwise herein, serves to direct the forming loop into chamber 130, and assists in its formation through the joint action of the direction from curved surface 140 and the rotational contacting by the roller.

Figure 13:
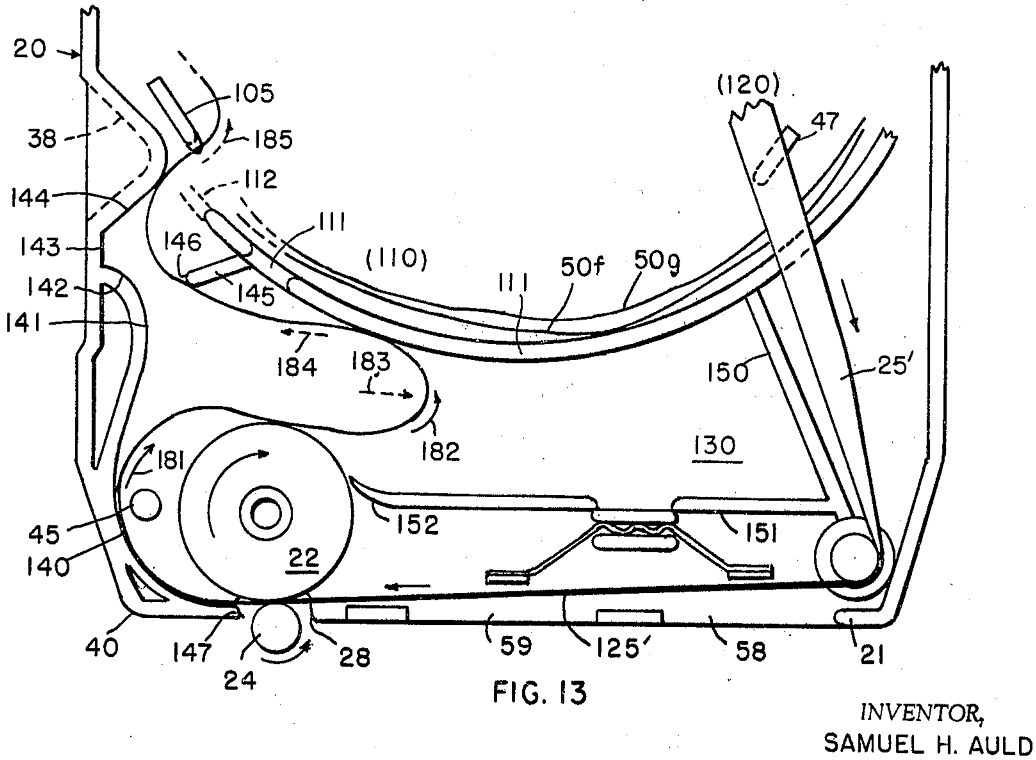
Figure 14:
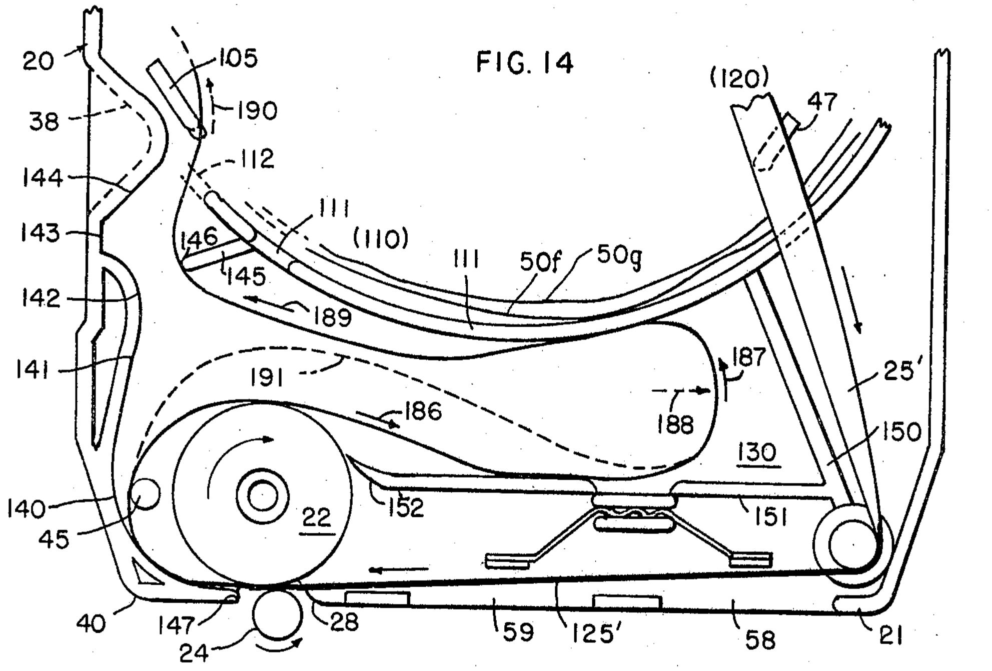

The tape swings proceed with the continual pushing-in of more tape at director surface 140 (along arrow 181) and the urging by the surface of roller 22, as shown in FIG. 13. A forward loop 182 forms, moving in the direction of arrow 183 further into chamber 130. The sides of loop 182 press between roller 22 and surround 111 during this process. In the meantime, the in-line forces created along the tape in the regions of arrows 184 and 185 force it to adjust thereat to the stoppage incurred at the reel entry region 115 involving surfaces at 105, 112, 114 as described hereinabove. Such blocking of tape movement occurs automatically, and insures the furtherance of the tape take-up into chamber 130. The loop 182 thereupon expands freely into chamber 130 as denoted by the next illustration, FIG. 14. The tape is moved into the cartridge by the capstan action, around director 140, post 45, and roller 22, in the direction of arrows 186, 187. The arrow 188 indicates the progress and expansion of this first full loop into chamber 130. Its formation proceeds at the lineal rate of 3¾" per second herein, determined by the capstan-roller tape drive.

Figure 15:
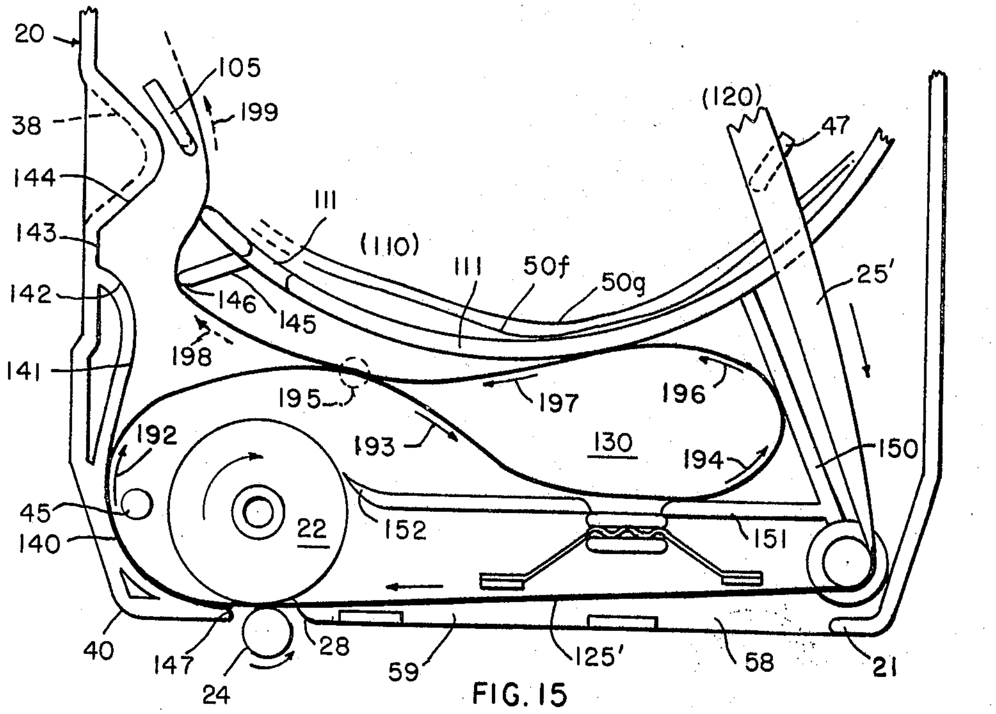

The tape portion at the reel entry region 115 is now stopped in its insertion to chamber 110, arrested as to linear progress, at arrows 189, 190. However, the tape may wiggle in small lateral displacements thereat, but does back-stop so that the serpentine formations in chamber 130 are effected. The actual positions and configurations that the tape assumes in chamber 130 occur in random array, but the underlying process and result remain basic. For example the loop formation of FIG. 14 may proceed with its lower leg out of contact with roller 22, as indicated at 191. In only a short interval later, the loop fills chamber 130 as seen in FIG. 15. The tape is moved out of director 140, at arrow 192, across the chamber along 193 and 194, making contact in the region 195 with the upper leg of the loop. The loop filling out has occurred in the vicinity of arrows 196, 197, and has remained linearly stationary at 198, 199.

Figure 16:
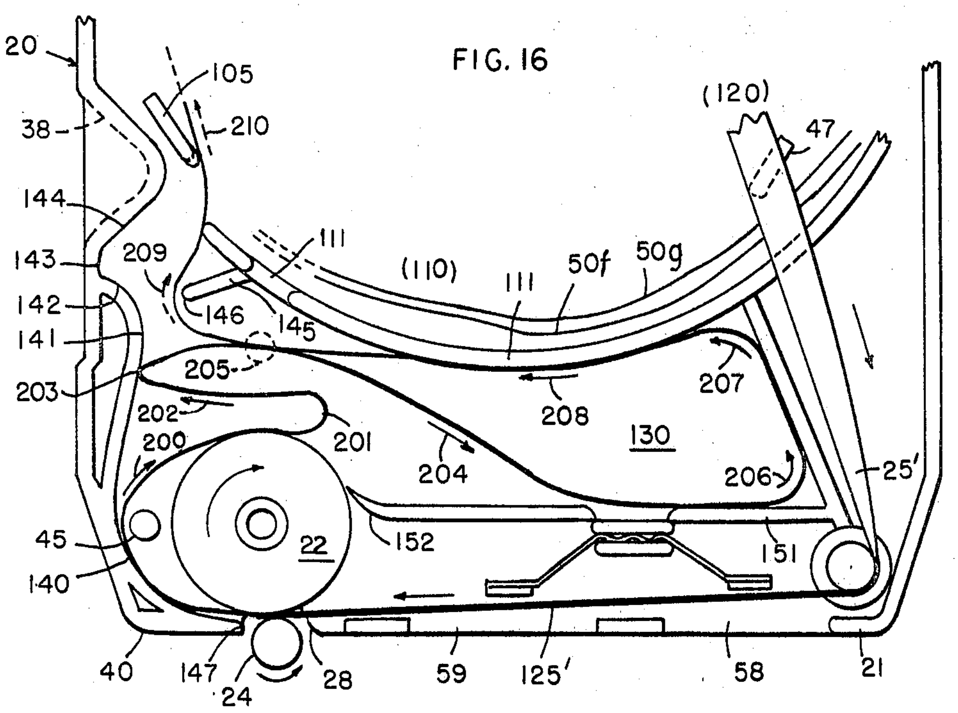

Referring now to FIG. 16, further tape injection has taken place, which is shaped or directed into further loops that are to crowd into chamber 130 and compress and distort the loop of FIG. 15. Generally, the shaping means 140 directs the tape along arrow 200 and it now touches rotating roller 22; has backed up as a secondary loop 201 and along path 202 to form a further loop over 203 that touches side wall 141, 142. The serpentine progress hereof presses the tangency region 205 with the main loop closer to surround 111. The loop along paths 204, 206 contacts forward chamber wall 151; fills into corners at 206, 207; and contacts a wide area of surround wall 111 along 208. The tape remains arrested at entry region 109, 110. It is to be noted that the secondary loop 203 may be formed at other wall portions, at 142, 143 or 144.

Figure 17:
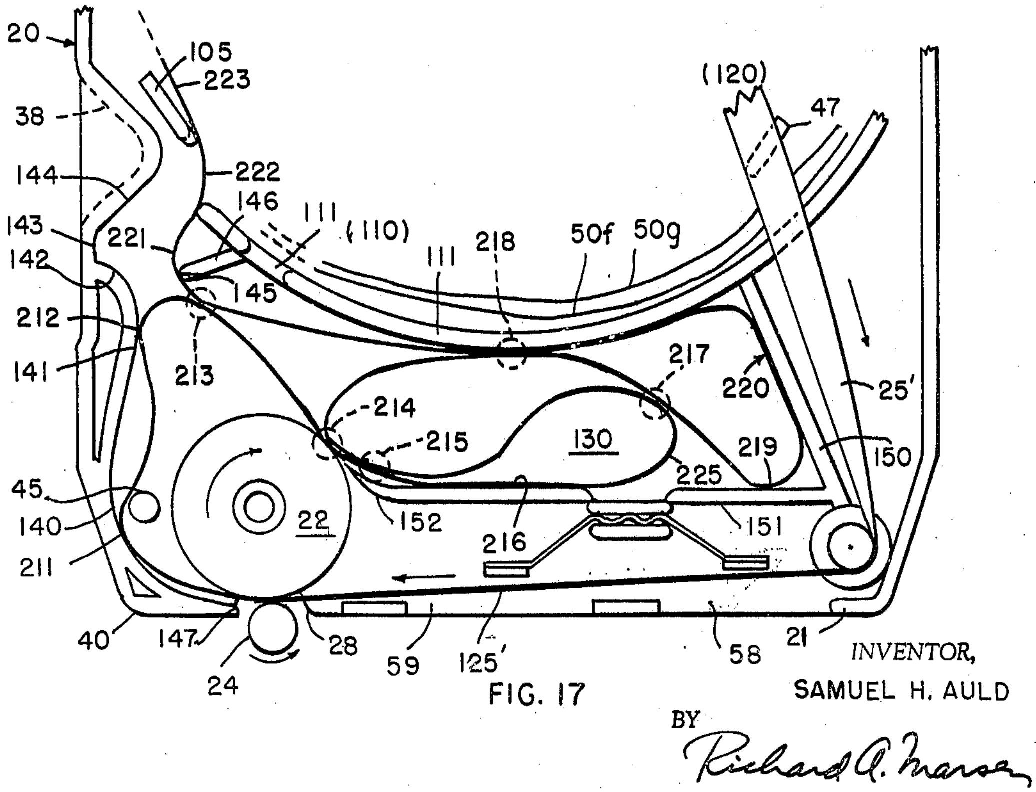

FIG. 17 represents all of the surplus tape 135 as contained in chamber 130, having been just inserted and instantaneously fully stored therein, as illustrated. Its curvatures, number of loops formed and general array differ at each formation, as will now be understood. The array of the surplus tape shown in FIG. 17 is as it developed and appears an instant before the reel 50 and spool 51 will start turning due to the pay-out action of the tape 21' described in connection with FIGS. 18 and 19. The last entered tape herein touches wall 140 at point 211; wall 142 at point 212; an upper tape section at region 213; the roller 22 at 214. The contacting all about, at contiguous wall surfaces or adjacent loops, is typical of this tape crowded-in phase. The tapes are contact at regions 213, 214, 215, 217 and 218. Secondary loop 225 lies along wall 151 at 216; and extends from inner loop 224. The initial loop 220 contacts wall 151 at 219, and surround 111 at 218. The initial tape section at entry region 115 is 221, 222, 223, held locked thereat whether in the position illustrated for fuller reels, or if it touched incline 144 as is often the case with smaller reels.

With less surplus length 135 fewer random loops are formed. For longer lengths, more loops are readily accommodated in chamber 130 hereof. The exemplary chamber 130, in a nominal 400' reel cartridge 20 with a 3¾" diameter spool 51, is about 3" across from director walls 140–144 to side wall 150; and about ⅝" centrally between walls 111, 151. Such chamber 130 can be incorporated in the cartridge without increasing its usual overall dimensions, which herein are 4" x 5½". This chamber 130 was found to have a take-up capacity of about 36" with excellent results. However, the average slack potential of a 400' reel is only about 12" to 15", so that ample chamber capacity is readily available at no cost for the space. The general shape or area of the take-up chamber 130, or the extent of its dimensions, are not of critical importance, as long as it permits ready serpentine loop formations to the capacity of the longest length of surplus tape 135 that may become extended for a full reel load, in the particular cartridge construction.

Figure 18:
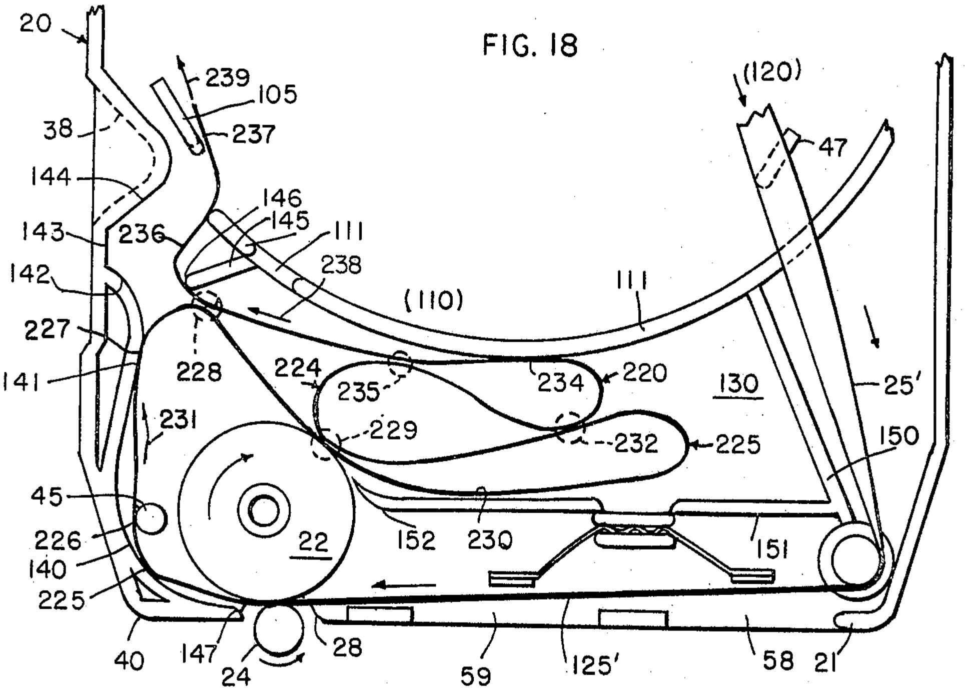
Figure 19:
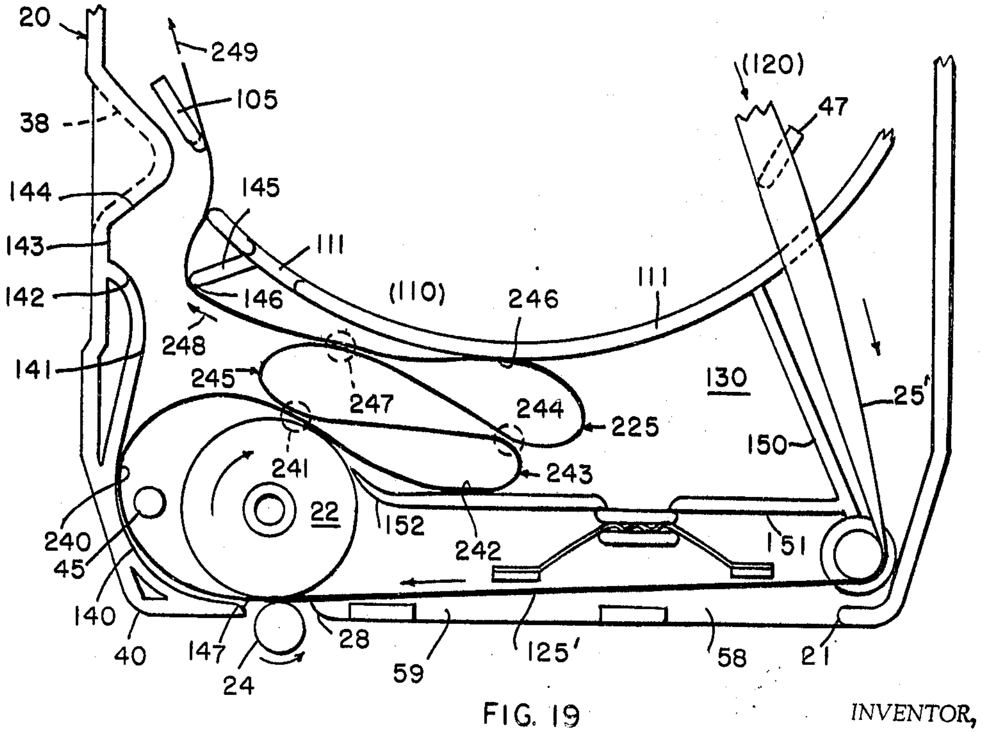

The exit or removal of the surplus tape 135 in take-up chamber 130 now proceeds, as illustrated in FIGS. 18 and 19. The roller-capstan, at this juncture, pulls on tape section 25' and pay-out tape from the inner convolutions of the reel 50, whereupon the reel and spool 50,51 turn. Initially, the two outer stalled loose turns **50*f*, 50*g* (FIG. 17) are taken-up on reel 50. As the outer diameter of the tape reel is larger than that at its inner turns being payed out, more tape is returned to the reel than is removed during the take-up phase. Tape is thereupon introduced to the curved director surface 140, at 225, and in the direction of arrow 231, touching post 45 at 226, wall surface 141 at 227, and a section of the loop 220 at 228. The secondary loop 225 of FIG. 17 is now smaller due to the simultaneous and faster serpentine removal action by the rotating reel 50 at 237, 239 along path 238 and loop 236 which may contact tip 146 of guide 145, and the parts of entry 115**.

It is to be noted that the reduction of the initial loop 220 proceeds apace, with negligible friction due to smooth surfaces involved in its contacts as at 228, 232, 234, 235. The interior loop 224 also reduces (compare to FIG. 17), while loop 225 foreshortens. The loop group is seen to recede to the left in this tape take-up phase shown in FIGS. 18 and 19. The newly introduced tape simultaneously forms further loops, as shown at 243 and 245 in FIG. 19. The initial loop 220 is now all rectified and on the reel, as is loop 224. The loop 225 is now closest to reel entry position, and is about to be taken-up along contacting areas 246, 247 and paths 248, 249. The new loops are supplied by the new tape portions entering along path 240, urged on by the roller at 241, and in sliding contacts 242, 244. However, as noted, the take-up onto reel 50 proceeds at a faster rate herein, and soon all of the take is taken-up out of chamber 130, and the reel returned to normal tape play orientation and operation, as illustrated in FIGS. 2 and 4.

The whole tape surplus rectification process proceeds automatically and rapidly as soon as the cartridge is inserted for play (or recording in some applications). The initial surplusage 135 basically from the annular upper chamber 120 is withdrawn to the take-up chamber (with a few inches of it into the reel chamber 110) at the capstan-roller rate, 3¾" per second herein. Thus in less than 4 seconds for a 400' reel the whole surplus tape section 135 is out of chamber 120 and the reel commences to rotate and pay-out tape. Even during this stage the tape is pulled past the pickup head 27 at the constant playing rate and normal sound reproduction proceeds. The cartridge presented to the player (or recorder) functions normally with respect to the magnetic head and circuits whether or not tape surplusage is present, and during any rectification involved. When no tape surplus is in the cartridge the operation is normal as shown in FIGS. 2 and 4, with no contact between the tape and the shaping and director members 140–146, or use of the chambers 120, 130. Should a tape surplus be present it is automatically rectified in a few seconds; safely, efficiently, with no tape wear or weakening. The tape surplusage rectification is effective for full or lightly tape reel loading; and is applicable to cartridges of a wide range of capacities. Further, the features and principles of the present invention are generally applicable to magazines or cartridges of of endless film, tape or other firm, pliable continuous medium, for optical or mechanical as well as magnetic transducers.

Although the present invention has been described and illustrated in connection with a particular embodiment thereof, it is to be understood that modifications and variations thereof will be apparent to those skilled in the art, and that it is not intended to be limited in application or scope except as set forth in the appended claims.

What is claimed is:

1. A magnetic tape cartridge adapted for transcription in a player unit that has a transducer head and a drive capstan, said cartridge comprising a housing containing a coil of magnetic tape in endless array, said housing being formed with open regions at its front wall for coaction of exposed tape portions with the transducer head and the drive capstan when the cartridge is positioned in the player unit, a pinch member in said housing for pressing tape portions contiguous thereto against the drive capstan to transport the tape laterally across the transducer head, a hub mounted in said housing and about which the tape coil is spirally wound, the inner coil turns at said hub normally being withdrawn through tension along the tape by the said drive capstan transport action and on to tape play coaction with the transducer head, the tape portions that are thus moved past said pinch member normally returning along a pathway to the tape coil as outer turns wound thereon while inner turns thereof are unwound and the coil is thereby rotated, means providing a region within said housing that is proportioned and arranged to receive and temporarily store limp tape sections when a substantial surplus tape length exists between the inner and outer coil turns, and tape deflecting means positioned adjacent the said pathway arranged to engage with tape portions when in limp condition due to the surplus length and guide sections thereof into the store region in serpentine looped array, whereupon outer coil turns subsequently withdraw the looped tape sections from said store region in an orderly manner and thereupon move them onto thhe outer coil as the tape transcription proceeds.

2. A magnetic tape cartridge according to claim 1, in which said tape deflecting means includes tape shaping means that effects an orderly serpentine looped array of the tape portions upon their deflection into said store chamber.

3. A magnetic tape cartridge according to claim 1 in which the pinch member is a roller that is rotated by the drive capstan, and said tape store region is a chamber with an open segment that is contiguous with an interior sector of said roller, whereby take-up of received tape sections is assisted at said sector by tape contact with the rotating roller.

4. A magnetic tape cartridge according to claim 2, in which the pinch member is a roller that is rotated by the drive capstan, and said tape store region is a chamber with an open segment that is contiguous with an interior sector of said roller, whereby take-up of received tape sections is assisted at said sector by tape contact with the rotating roller.

5. A magnetic tape cartridge according to claim 1, in which said housing comprises a base and a cover spaced apart more than twice the tape width, and means arranged between said base and cover at said tape store region proportioned to confine its effective interior height to less than twice the tape width.

6. A magnetic tape cartridge according to claim 2, in which said housing comprises a base and a cover spaced apart more than twice the tape width, and means arranged between said base and cover at said tape store region proportioned to confine its effective interior height to less than twice the tape width.

7. A magnetic tape cartridge according to claim 5, in which said region confining means contains surface sections extending above said base and to said tape store region for supporting lower edges of tape when stored therein, said surface sections being spaced by less than twice the tape width from opposite interior portions of the cover, for effectively accomodating the tape take-up in random serpentine array.

8. A magnetic tape cartridge according to claim 5, in which said region confining means comprises a platform extending above said base and to said tape store region, said platform being substantially parallel to said base and having upper surface sections for supporting lower edges of tape when stored in said region.

9. A magnetic tape cartridge according to claim 5, further including a surrounding wall extending about the tape coil section adjacent to said tape store region and forming a wall of said region, said surrounding wall confining outer coil turns that are loosened during the surplus tape rectification.

10. A magnetic tape cartridge adapted for transcription in a player unit that has a transducer head and a drive capstan, said cartridge comprising a housing containing a magnetically coated tape in endless array and a hub about which the tape is spirally coiled, means for guiding the tape between its inner and outer coil turns and across the transducer head during its normal transport action by the capstan when the cartridge is positioned in the player unit for transcription, the inner coil turns at said hub being normally withdrawn through said transport action and on to tape play coaction with the transducer, the tape that is thus moved into play coaction being normally drawn onto the tape coil as outer turns wound thereon while inner turns thereof are being unwound and the coil is thereby rotated, means providing a region within said housing that is proportioned and arranged to receive and temporarily store tape sections in an orderly manner when a substantial surplus tape length that is limp exists between the inner coil turn and the tape portion at the capstan and which thus prevents the said coil rotation during the transcription action, and means that deflects limp surplus tape sections and guides them into the said store region after they are moved past the capstan, whereby when inner turns of the coil are withdrawn following entry of the said limp tape surplus length into said region rotation of the coil correspondingly starts and the stored limp surplus tape sections are thereupon withdrawn from said region by outer coil turns and moved directly onto the outer coil as turns during said rotation.

11. A magnetic tape cartridge as claimed in claim 1, further including means positioned adjacent entry of the tape onto the outer coil turns to stop tape movement thereat when the tape is in a limp state.

12. A magnetic tape cartridge according to claim 10, said deflecting means including tape shaping means positioned adjacent the normal tape return path to outer coil turns, for effecting tape take-up into said region in loop configuration.

13. A magnetic tape cartridge according to claim 11, said deflecting means including tape shaping means positioned adjacent the normal tape return path to outer coil turns, for effecting tape take-up into said region in loop configuration.

14. A cartridge as claimed in claim 10, in which the interior height of the region is of the order between one and two times the tape, for accommodating the tape take-up in random serpentine array.

15. A cartridge as claimed in claim 1, further including means adjacent the entry region to the tape outer turns for stopping the injection of the tape therethrough during the rectification of surplus tape when the tape portion thereat tends to be oriented parallel to the tape reel axis.

16. A cartridge as claimed in claim 15, in which said tape stopping means comprises a pair of members astride the tape passage each with an edge inclined with respect to the said reel axis.

17. A cartridge as claimed in claim 1, further including a store chamber arranged above the tape coil wherein a substantial amount of the surplus tape is stored until rectified onto the tape coil.

18. A cartridge as claimed in claim 10, further including a store chamber arranged above the tape coil of toroidal shape coaxial with the coil wherein a substantial amount of the surplus tape is stored until wound onto the tape coil.

19. A cartridge as claimed in claim 10, further including a store chamber arranged above the tape coil coaxial with the coil the interior height of said store chamber being of the order of the tape width wherein a substantial amount of the surplus tape is stored until wound onto the tape coil.

References Cited

UNITED STATES PATENTS

| | | | |
|---|---|---|---|
| 3,252,670 | 5/1966 | Smith | 242—55.19 |
| 2,778,880 | 1/1957 | Eash. | |
| 2,908,769 | 10/1959 | Fonda. | |
| 2,945,692 | 7/1960 | Maeder | 226—93 |
| 3,155,335 | 11/1964 | Maeder. | |
| 3,259,332 | 7/1966 | Francis. | |
| 3,289,964 | 12/1966 | Vito. | |

BILLY S. TAYLOR, Primary Examiner

U.S. Cl. X.R.

179—100.2; 226—118; 274—11